UNITED STATES PATENT OFFICE 2,668,845

O,O-BIS(4-NITROPHENYL) ALKANE-PHOSPHONATES

Henry Tolkmith, Midland, Mich., assignor to The Dow Chemical Company, Midland, Mich., a corporation of Delaware No Drawing. Application April 21, 1953,
Serial No. 350,229

3 Claims. (Cl. 260—461)

The present invention is directed to the O,O-bis-(4-nitrophenyl) alkanephosphonates of the formula

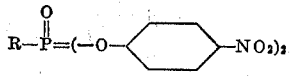

In this and succeeding formulae R represents methyl or ethyl. These compounds are crystalline solids, somewhat soluble in many organic solvents and substantially insoluble in water. They are of value as intermediates for the preparation of more complex phosphorus derivatives and as toxic constituents of parasiticide compositions.

The new compounds may be prepared by reacting two molecular proportions of 4-nitrophenol with one molecular proportion of an alkanephosphonic dichloride of the formula:

in an inert organic solvent such as diethyl ether or benzene. The reaction is carried out in the presence of a hydrogen chloride acceptor such as pyridine.

In carrying out the reaction, the 4-nitrophenol and pyridine are dispersed in the solvent and the resulting mixture added portionwise with stirring to the alkanephosphonic dichloride dispersed in the same solvent. Upon completion of the contacting of the reactants, the mixture is heated at a temperature of from 35° to 80° C. for a short period of time to complete the reaction. The reaction is somewhat exothermic and takes place smoothly at the temperature range of from 30° to 80° C. The temperature may be controlled by regulation of the rate of contacting the reactants and by the addition or subtraction of heat, if required. Upon completion of the reaction, the mixture may be filtered and the filtrate distilled under reduced pressure at gradually increasing temperatures to separate low boiling constituents and to obtain as a residue the desired O,O-bis(4-nitrophenyl) alkanephosphonate. Distillation temperatures substantially in excess of 100° C. for any appreciable period of time should be avoided as the desired products have a tendency to decompose at such temperatures.

*Example 1.—O,O - bis(4 - nitrophenyl) methanephosphonate*

32.7 grams (0.236 mole of 4-nitrophenol and 22 grams (0.278 mole) of pyridine were dispersed in 200 milliliters of diethyl ether and the resulting mixture added portionwise with stirring to 15.3 grams (0.115 mole) of methanephosphonic dichloride (having a boiling point of 163° C. at atmospheric pressure) dispersed in 200 milliliters of diethyl ether. The resulting mixture was thereafter heated for 3 hours at the boiling temperature and under reflux to complete the reaction. The reaction product was then filtered and the filtrate distilled under reduced pressure to a temperature up to 80° C. to obtain as a residue O,O - bis(4 - nitrophenyl) methanephosphonate. The latter is a crystalline solid melting at 155° C.

*Example 2.—O,O-bis(4-nitrophenyl) ethanephosphonate*

32.7 grams (0.236 mole) of 4-nitrophenol and 22 grams (0.278 mole) of pyridine were dispersed in 200 milliliters of diethyl ether and the resulting mixture added portionwise with stirring to 17 grams (0.115 mole) of ethanephosphonic dichloride (having a boiling point of 175° C. at atmospheric pressure) dispersed in 200 milliliters of diethyl ether. The mixture was thereafter heated for 3 hours at the boiling temperature and under reflux to complete the reaction. At the end of this period, the reaction product was filtered and the filtrate concentrated by distillation under reduced pressure to a temperature up to 55° C. to obtain as a residue O,O-bis-(4-nitrophenyl) ethanephosphonate. The latter is a crystalline solid melting at 138° C.

The new O,O-bis(4-nitrophenyl) alkanephosphonate products are effective as parasiticides and adapted to be employed for the control of a wide range of agricultural and household pests such as flies, mites, aphids, beetles, cockroaches and Southern army worms. For such use, the compounds may be dispersed in an inert finely divided solid and employed as a dust. Also, such mixtures may be dispersed in water with the aid of a dispersing and wetting agent and the resulting aqueous suspensions employed as sprays. In other procedures, the new products may be employed in oils, as constituents in oil-in-water emulsions, or in water dispersion with or without the addition of emulsifying, wetting or dispersing agents. Suitable concentrations of the toxicants in dusts are in the order of from about 0.1 to 10 percent by weight of the dust and in liquid suspensions from about 0.1 to 3 pounds per 100 gallons of the spray mixture. In operations illustrative of the effectiveness of the new compounds, 100 percent kills of two-spotted spider mites and Mexican bean beetles were obtained with aqueous spray compositions containing 0.5 and 1.0 pound, respectively, of the toxic O,O-bis(4-nitrophenyl) methanephosphonate per 100 gallons of spray mixture.

This is a continuation-in-part of my copending application Serial No. 203,756, filed December 30, 1950.

I claim:

1. An O,O - bis(4 - nitrophenyl) alkanephosphonate of the formula

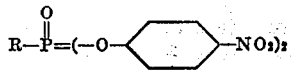

wherein R represents a member of the group consisting of methyl and ethyl.

2. O,O - bis(4 - nitrophenyl) methanephosphonate.

3. O,O-bis(4-nitrophenyl) ethanephosphonate.

HENRY TOLKMITH.

No references cited.